(12) United States Patent
Kusumoto et al.

(10) Patent No.: US 6,227,236 B1
(45) Date of Patent: May 8, 2001

(54) WIDELY VARIABLE CONDUCTANCE VALVE

(75) Inventors: Satoru Kusumoto; Ryoichi Oka, both of Yokohama (JP)

(73) Assignee: Megatorr Corporation, Yokohama (JP)

( * ) Notice: Subject to any disclaimer, the term of this patent is extended or adjusted under 35 U.S.C. 154(b) by 0 days.

(21) Appl. No.: 09/612,928

(22) Filed: Jul. 10, 2000

(30) Foreign Application Priority Data

Nov. 22, 1999 (JP) .................................................. 11-330845

(51) Int. Cl.⁷ .................................................. F16K 49/00

(52) U.S. Cl. ........................ 137/341; 137/625.3; 137/629; 251/319; 118/620

(58) Field of Search .............................. 137/341, 625.3, 137/629; 251/319; 118/620

(56) References Cited

U.S. PATENT DOCUMENTS

| | | |
|---|---|---|
| 5,318,272 | 6/1994 | Smith . |
| 5,413,139 * | 5/1995 | Kusumoto et al. .................. 137/341 |
| 5,485,542 * | 1/1996 | Ericson ............................... 137/341 |
| 5,678,595 * | 10/1997 | Iwabuchi ............................. 137/341 |

FOREIGN PATENT DOCUMENTS 6-185671    7/1994   (JP) .

* cited by examiner

*Primary Examiner*—A. Michael Chambers
*Assistant Examiner*—Thomas L. McShane
(74) *Attorney, Agent, or Firm*—Jordan and Hamburg LLP

(57) ABSTRACT

Flow of processing gas is controlled by one valve from the atmospheric pressure to a substantial vacuum pressure. A valve body is disposed in a valve chamber having an inlet to be connected with a reaction chamber and an outlet to be connected with an evacuation pump. The valve body includes a first disc-shaped valve body portion to be pressed against a flange portion of a valve seat and a second disc-shaped valve body portion which is screwed on an end surface of the first valve body portion and adjusted its alignment. The second valve body portion is inserted into a valve hole of the valve seat. The first valve body portion has a circular groove at one of its surfaces to be brought into contact with the flange portion and an O-ring in the groove so as to choke fluid flow when in contact with the valve seat. The second valve body portion has tapered notches of which depths are gradually decreased from downstream to upstream. As the second valve body portion slides in the valve seat, each gap between the notches and the valve seat changes to vary a cross-sectional area of fluid passage. Back and forth movements of the valve body portion provide any state among open, minimum flow control and closed states.

11 Claims, 4 Drawing Sheets

WIDELY VARIABLE CONDUCTANCE VALVE

BACKGROUND OF THE INVENTION

The present invention relates to a valve disposed in an exhausting line of an evacuation device such as a CVD (Chemical Vapor Deposition) device in order to stop/start exhausting gas flow and to control evacuation conductance automatically. More particularly the present invention relates to a widely variable conductance valve driven with an electric motor which is applicable to controlling of process gas in a semiconductor fabrication process using a reduction pressure CVD device, for example.

To describe an evacuation device where a valve of the present invention may be used, function of a valve will be described below referring to a major semiconductor fabrication device, for example.

FIG. 1 generally illustrates a device applicable to system of semiconductor fabrication such as a reduction pressure CVD device.

The reference sign A depicts an evacuation pump, B depicts a variable valve, and C does a reaction chamber where a work to be processed is placed. The reaction chamber C is connected with a process-gas supply E through a mass-flow controller D. The reference sign F depicts a vacuum gauge for monitoring pressure in the reaction chamber C. A pressure signal detected by the vacuum gauge F is transmitted to an automatic pressure controller G to be compared with a predetermined pressure signal so as to output a drive signal for adjusting an opening degree of the variable valve B. The drive signal adjusts the opening degree of the variable valve so that the pressure in the reaction chamber C is controlled to be the predetermined pressure. Further, the reference sign H is a heater for heating the reaction chamber C.

A silicon wafer I to be processed is placed in the reaction chamber C which is connected with the process gas supply E, and the valve B is opened to evacuate the reaction chamber C down to a target pressure, about 0.5 Pa. Then a process gas such as $NH_3$ (ammonia) is introduced into the reaction chamber C from the process-gas supply E via the mass flow controller D so as to regulate the opening degree of the variable valve B to be a predetermined pressure, about 133 Pa, monitoring the pressure in the reaction chamber C with the vacuum gauge F. Upon supply of the process gas and suction of the gas by the evacuation pump A via the valve B, the silicon wafer I is deposited under the predetermined pressure of the process gas. During the process the reaction chamber is controlled by the opening degree of the valve B to be at the predetermined pressure. Further, on completion of the process, the introduction of the process gas is stopped, and the valve B is fully opened to evacuate the reaction chamber C to the target pressure. The variable valve B is then fully closed to increase the pressure in the reaction chamber C up to the atmospheric pressure, thereby taking finished products out of the chamber.

FIG. 2 exemplifies a conventional variable valve used in the above device.

The reference numeral 101 depicts a throttle valve body having a flange portion 101b circumscribing a fluid passage 101a. The numeral 102 is a disc-shaped valve body having almost the same diameter as that of the fluid passage 101a of the throttle valve body 101, and the valve body 102 is openably mounted at the fluid passage 101a. The reference numeral 103 depicts a drive shaft for connecting the valve body 102 with a valve drive portion 104. The drive shaft 103 is connected with the valve body 102 by means of a pin 105 so as to turn integrally with the valve body 102. A drive means within the drive portion 104 turns the drive shaft 103 to rotate the valve body 102 and change an opening area of the fluid passage 101a.

As mentioned above, during the process the pressure in the reaction chamber C must be controlled within a wide range from the atmospheric pressure (1013 HPa) to a few Pa. Further, a pressure around the few Pa, the lowest limitation of the range, must be finely controlled. In the conventional variable valve which is a throttle valve, the valve body 102 may be turned to control the process gas to be a few Pa but cannot prevent leakage when fully closed because of its structure. On completion of the process, the pressure in the reaction chamber C is brought to the atmospheric pressure. Thus, even if the valve is fully closed, the valve is not able to be completely isolate the reaction chamber C from the evacuation pump A. Therefore an isolating means has been separately needed.

Most process gases used in semiconductor fabrication liquefy at an ambient temperature. When a process gas is cooled down, it may be deposited on an inner wall of a device. It may also be deposited on outer surfaces of the valve body or inner surfaces of a flange. As such deposition increases, an appropriate adjustment of an opening degree may not be completed. In the worst case, the valve body would not move to open or close. Then, such a throttle valve is disassembled to clean its valve body, inner surface of flange etc. However such disassembling and cleaning is troublesome. Further, most of process gases are toxic and dangerous, and care should be taken to handle these process gases. Such a conventional valve may have heaters on at a valve body and a flange portion to prevent deposits of materials, whereby simplifying such device and decreasing the number of components.

SUMMARY OF THE INVENTION

An object of the present invention is to provide a widely variable conductance valve which control a flow rate of a process gas used in a semiconductor fabrication device by means of only one control valve and to adjust a pressure in a reaction chamber from the atmospheric pressure to a substantial vacuum pressure, thereby simplifying the structure of the device.

Another object of the present invention is to provide a widely variable conductance valve, comprising:

a tubular valve chamber;

an inlet for connecting with a reaction chamber;

an outlet for connecting with an evacuation pump;

a short tubular valve seat mounted at the outlet, the valve seat having a pipe joint formed downstream and a circumferential flange portion formed upstream;

a valve body disposed in the valve chamber, the valve body being movable back and forth against the valve seat;

a first disc-shaped valve body portion having a diameter to stop a fluid, the first valve body portion being in contact with the flange portion;

a second disc-shaped valve body portion screwed on an end surface of the first valve body portion, wherein the first and second valve body portions are aligned, the second valve body portion has almost the same diameter as an inner diameter of a valve hole of the valve seat so as to be inserted into the valve hole; and a tapered notch formed at the second disc-shaped valve body portion, depths of the tapered notch being gradually decreased from downstream to upstream.

Another object of the present invention is to provide a widely variable conductance valve comprising a plurality of notches at a circumference of the second valve body portion.

Another object of the present invention is to provide a widely variable conductance valve in which cross sectional area and shape of each notch are determined according to a range of flow rates to be controlled and a moving distance of the second valve body portion against the valve seat.

Another object of the present invention is to provide a widely variable conductance valve comprising a plurality of second valve body portions having a plurality of notches of different numbers and of different shapes so as to exchange one of valve body portions with another according to a range of flow rate to be controlled and a flow characteristic.

Another object of the present invention is to provide a widely variable conductance valve in which the valve body is moved against the valve seat by a piston rod connected with a valve drive portion constructed of a gear box and an electric motor, the piston rod being inserted into the gear box via a partition mounted at opposing side to the outlet and a sealing mechanism.

Another object of the present invention is to provide a widely variable conductance valve, further comprising heaters mounted on an outer surface of the valve chamber, the second valve body portion and a partition opposing to the outlet at the valve chamber and enclosed in the piston rod.

PREFERRED EMBODIMENT OF THE INVENTION

Figure 1:
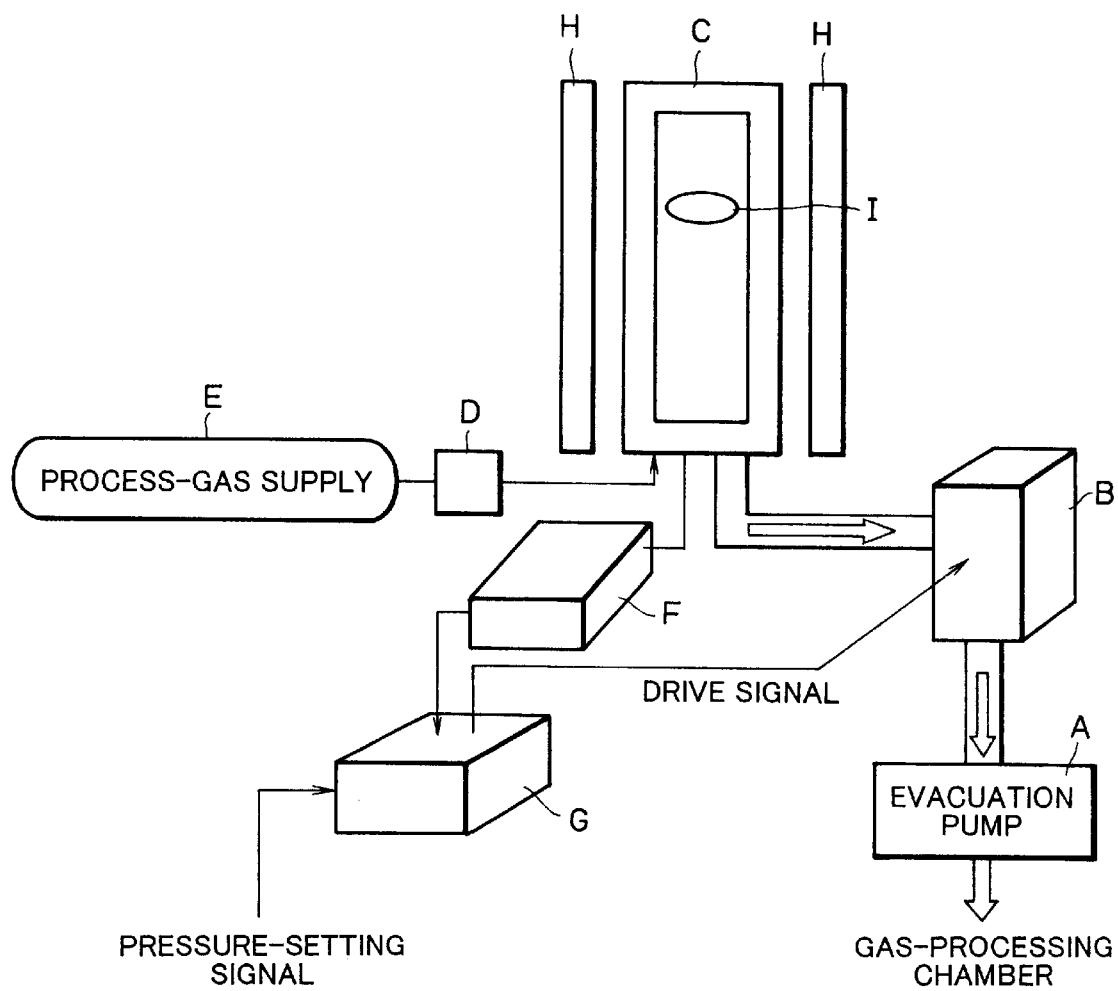
FIG. 1 generally illustrates a device applicable to system of semiconductor fabrication such as a reduction CVD device.
Figure 2:
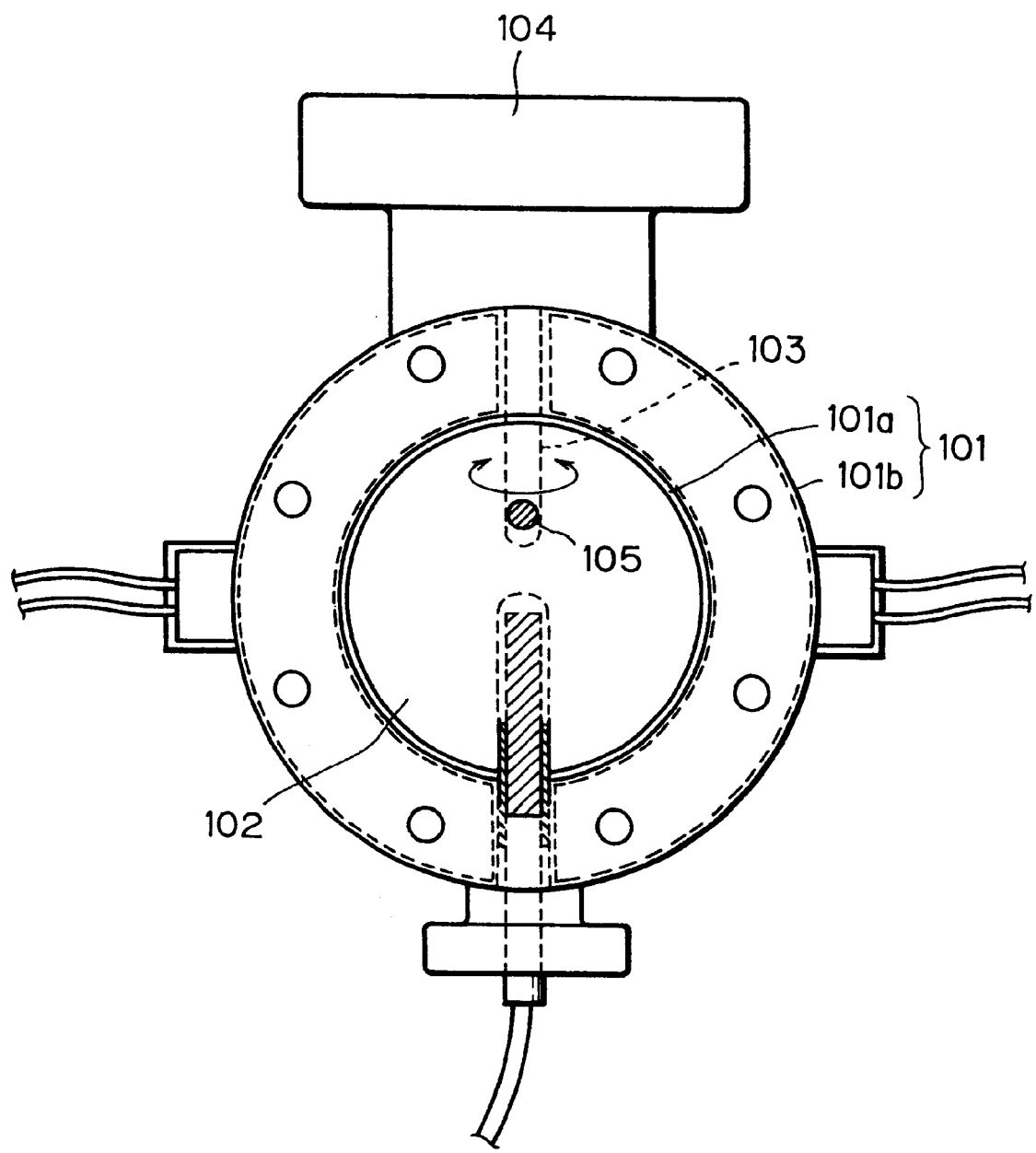
FIG. 2 exemplifies a conventional variable valve used in the above device.
Figure 3:
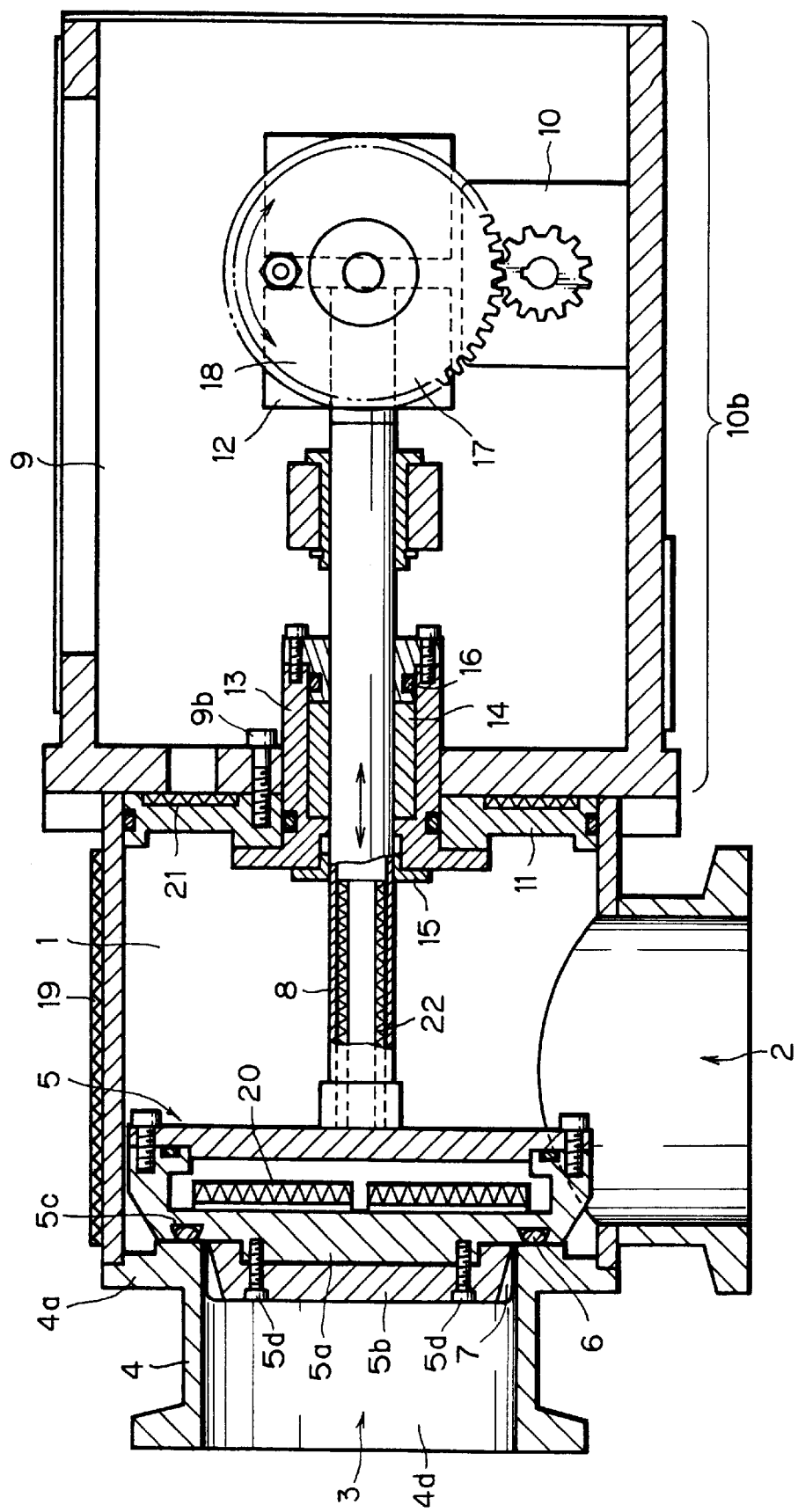
FIG. 3 illustrates an embodiment of a widely variable conductance valve of the present invention.

FIG. 3 illustrates an embodiment of a widely variable conductance valve of the present invention.

The reference numeral 1 depicts a tubular valve chamber having an inlet 2 and an outlet 3. The inlet 2 is connected with a reaction chamber C and the outlet 3 is connected with an evacuation pump A. The inlet 2 and the outlet 3 have standard flanges respectively so that they may be easily connected with other piping.

At the outlet 3 of the valve chamber 1, a short tubular valve seat 4 is mounted and has a pipe joint formed downstream and a circumferential flange portion 4a formed upstream. A valve body 5 is disposed in the valve chamber 1. The valve body 5 is constructed of a first and a second disc-shaped valve body portions 5a, 5b. The first valve body portion 5a has a diameter to stop a fluid from flowing in contact with the flange portion 4a. The second valve body portion 5b is screwed 5d on an end surface of the first valve body portion 5a and adjusted its alignment, and has almost the same diameter as an inner diameter of a valve hole 4d of the valve seat 4.

The valve body portion 5a has a circular groove 5c which is formed on the surface to be brought in contact with the flange portion 4a of the valve seat 4. An O-ring 6 for sealing is disposed in the groove 5c to stop a fluid from flowing when the O-ring 6 is in contact with the valve seat 4. When the valve body portion 5b is inserted into the valve hole 4d of the valve seat 4, its circumferential portion is in contact with inner surface of the valve hole 4d to be slidable in the thrust direction of the valve hole 4d. Around the second valve body portion 5b, there are provided tapered notches 7 of which depths are gradually decreased from downstream to upstream. As the second valve body portion 5b slides within the valve seat 4, gaps between the inner surface of the valve seat 4 and notches 7 change in size to vary cross sectional area of fluid passage. The number and shape of the notches 7 may be arbitrarily designed to give a desired flow characteristic based on a flow amount to be controlled and a desired moving distance of the second valve body portion 5b against the valve seat 4.

Figure 4:
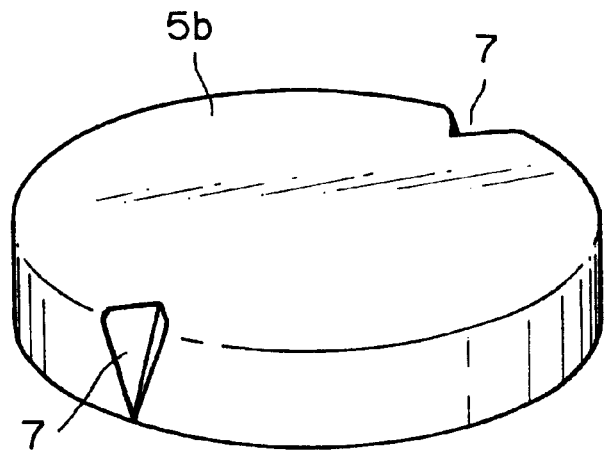
FIG. 4 illustrates an example of notches formed on the second valve body portion 5b.
Figure 5:
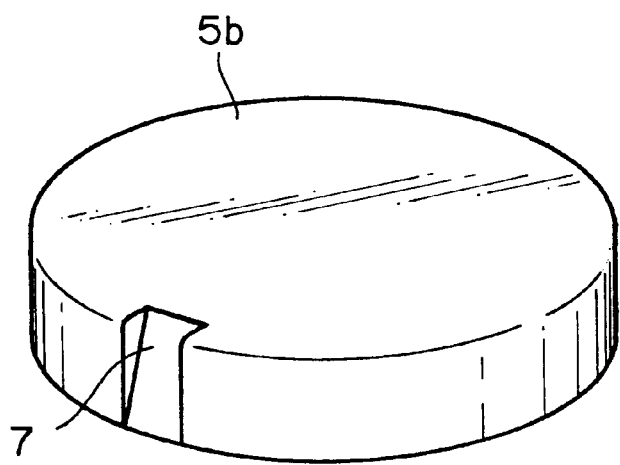
FIG. 5 shows another example of notches formed on the second valve body portion 5b.

FIGS. 4 and 5 respectively illustrate examples of notches 7 formed on the second valve body portion 5b.

The notches 7 shown in FIG. 4 are triangles in shape. Each triangle has one point on the circumferential surface of the second valve body portion 5b and two other points having the same distances from the one point. These three points make the triangle.

FIG. 5 shows another example of notches 7 in almost a rectangular shape which circumscribes a pair of points on the circumferential surface of the valve body portion 5b and another pair of points parallel to the former pair.

Since the valve body portions 5a and 5b are screwed with a screw 5d together, one of a plurality of the second valve body portion 5b having notches 7 of different numbers and of different shapes may be exchanged with another one, if necessary, thereby providing a variable valve adjustable within a different range of flow rates to attain a desired conductance characteristic.

The valve body portions 5a and 5b may be detachably secured with other securing means such as hooks, latches, screws formed at peripherals of the valve body portions.

The reference numeral 8 depicts a piston rod for connecting the valve body 5 with a valve drive portion 10b including a gear box 9 and an electric motor 10. One end of the piston rod 8 is connected with the center of the valve body portion 5b, the other end is connected with a plate cam 12 through a flange 11 mounted at one surface of the valve chamber 1 opposing to the outlet 3 to be a partition and is inserted into the gear box 9 which is screwed with a screw 9b together with the flange 11. The plate cam 12 converts rotation of the electric motor 10 to translation. The piston rod 8 is airtightly held at through holes of the flange 11 and the gear box 9 by means of a sleeve 13, a bush 14 and a seal holder 15, and the valve chamber 1 is shielded from atmosphere. Bellows could be used as a means for air-tight sealing a gap between the valve chamber 1 and the piston rod 8, however, it is not preferable because of reasons stated below.

Rotation of the electric motor 10 mounted on an inner wall of the gear box 9 is reduced with the gear box, and converted to translation with a cam mechanism constructed of the plate cam 12 and a rod 18 eccentrically fixed on a reduction gear 17 so as to move the piston rod 8 in its thrust direction as shown by an arrow. The valve body 5 mounted on one end of the piston rod 8 in cooperation with the valve seat 4, in their spatial relationship, may adjust a fluid flowing through a gap between them from a closing state to an open state via a minimum flow state.

In other words, the piston rod 8 reaches the left end (as shown in FIG. 3) to have the valve body portion 5a pressed in contact with the flange portion 4a of the valve seat 4 to close the valve. When the piston rod 8 moves to the right, the valve body portion 5a is released from the contact with the flange portion 4a of the valve seat 4 to cause a gap between the valve seat 4 and the valve body portion 5b due to the notches 7 of the valve body portion 5b to form a fluid passage. As the piston rod 8 further moves to the right, a cross-sectional area of the fluid passage becomes larger. When the valve body portion 5b is removed from the valve seat 4, the valve is in an open state.

According to the shapes and the number of the notches 7 formed at the valve body portion 5b, small flow rates between a closed state and an open state of the valve as well as a desired flow characteristic to moved distances of the piston rod may be arbitrarily designed. Further, a moving speed of the piston rod 8 may be adjusted relative to the cam mechanism. In the embodiment, fine adjustment is carried out in small flow rate sections by moving the piston rod 8 slowly and a fast movement of the piston rod is adopted in open sections. Naturally, the electric motor may adjust the movements by changing its rotational speed or angle of rotation.

Since the valve chamber 1 allows a process gas to pass through and is under the process gas during processing, heaters are located at several portions to prevent inner surfaces and surfaces of valve components from depositing of material. While the material does not deposit at about 200° C.

A heater 19 is mounted on an outer surface of the valve chamber 4, and a heater 20 is disposed within the valve body portion 5b so that heat by the heaters is conducted to the valve body portion 5a so as to prevent the whole valve body 5 from depositing of the material. Another heater 21 is disposed at the flange 11 which is disposed at the opposing side to the outlet 3 of the valve chamber so as to be a partition between the valve chamber 1 and the gear box 9. Further, a heater 22 is enclosed in the piston rod 8 as well.

Furthermore, since the piston rod 8 is moved, being held with a sealing mechanism including the sleeve 13, the bush 14, the seal holder 15 and an O-ring for vacuum sealing at through holes of the flange 11 and the gear box 9, any deposits on these components may affect smooth movement. O-ring 16 for sealing the piston rod 8 is disposed apart from the valve chamber 1 to be free from any deposits on the rod.

A bellows for sealing between the valve chamber 1 and the piston rod 8 is not preferable, because such a bellows has a corrugated surface with larger area which tends to be easily deposited. Further, it is difficult to mount a heater on the bellows surface because of the corrugation.

The advantages of the present invention are as follows.

A widely variable conductance valve of the present invention provides a wide range of adjustment from the atmospheric pressure to a few Pa by one valve means, whereby the valve assembled in a semiconductor processing device may simplify its arrangement.

Further, a valve body and a valve chamber may be heated at 200° C. to prevent the inner surfaces thereof from depositing of a process gas. Furthermore, a heater for preventing deposits is enclosed in a piston rod so that disassembling and cleaning of such device for removing deposits is not needed, thereby making its maintenance easier.

A variable valve with a desired pressure range and conductance is easily obtained by exchanging not the whole valve body but one end thereof.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the claims.

What is claimed is:

1. A widely variable conductance valve, comprising:
   a valve chamber;
   an inlet of the valve chamber for connecting with a reaction chamber;
   an outlet of the valve chamber for connecting with an evacuation pump;
   a valve seat mounted at the outlet;
   a first disc-shaped valve body portion having a diameter to stop a fluid in contact with the valve seat;
   a second disc-shaped valve body portion detachably secured to the first valve body portion to engage the valve seat; and
   a tapered notch formed at the second disc-shaped valve body portion, cross sectional areas of the tapered notch being gradually decreased from downstream to upstream.

2. A widely variable conductance valve as defined in claim 1, wherein a plurality of notches are formed at a circumference of the second valve body portion.

3. A widely variable conductance valve as defined in claim 1, wherein cross sectional area and shape of each notch are determined according to a range of flow rates to be controlled and a moving distance of the second valve body portion against the valve seat.

4. A widely variable conductance valve as defined in claim 2, wherein cross sectional area and shape of each notch are determined according to a range of flow rates to be controlled and a moving distance of the second valve body portion against the valve seat.

5. A widely variable conductance valve as defined in claim 2, wherein a plurality of second valve body portions having notches of different numbers and of different shapes are provided so as to exchange one of the second valve body portions with another according to a range of flow rates to be controlled and a flow characteristic.

6. A widely variable conductance valve as defined in claim 3, wherein a plurality of second valve body portions having notches of different numbers and of different shapes are provided so as to exchange one of the second valve body portions with another according to a range of flow rates to be controlled and a flow characteristic.

7. A widely variable conductance valve as defined in claim 4, wherein a plurality of second valve body portions having notches of different numbers and of different shapes are provided so as to exchange one of the second valve body portions with another according to a range of flow rates to be controlled and a flow characteristic.

8. A widely variable conductance valve as defined in any one of claims 1 to 7, wherein the valve body is moved against the valve seat by a piston rod connected with a valve drive portion constructed of a gear box and an electric motor, the piston rod being inserted into the gear box via a partition mounted at one side opposing to the outlet at the valve chamber and via a sealing mechanism.

9. A widely variable conductance valve as defined in any one of claims 1 to 7, further comprising heaters mounted on an outer surface of the valve chamber, the second valve body portion and the partition opposing to the outlet at the valve chamber and enclosed in the piston rod.

10. A widely variable conductance valve as defined in claim 8, further comprising heaters mounted on an outer surface of the valve chamber, the second valve body portion and the partition opposing to the outlet at the valve chamber and enclosed in the piston rod.

11. A widely variable conductance valve, comprising:

a tubular valve chamber;

an inlet for connecting with a reaction chamber;

an outlet for connecting with an evacuation pump;

a short tubular valve seat mounted at the outlet, the valve seat having a pipe joint formed downstream and a circumferential flange portion formed upstream;

a valve body disposed in the valve chamber, the valve body being movable back and forth against the valve seat;

a first disc-shaped valve body portion having a diameter to stop a fluid, the first valve body portion being in contact with the flange portion;

a second disc-shaped valve body portion screwed on an end surface of the first valve body portion, wherein the first and second valve body portions are aligned, the second valve body portion has almost the same diameter as an inner diameter of a valve hole of the valve seat so as to be inserted into the valve hole; and a tapered notch formed at the second disc-shaped valve body portion, depths of the tapered notch being gradually decreased from downstream to upstream.

* * * * *